March 22, 1927.
O. A. FREDERICKSON
1,622,032
ELECTRICAL CONDUIT
Filed Aug. 20, 1925
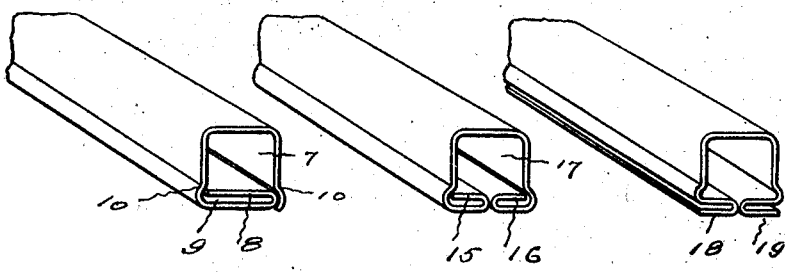
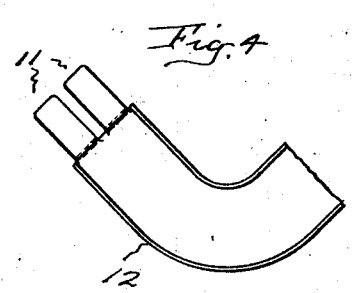
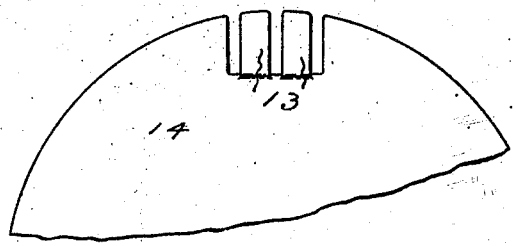
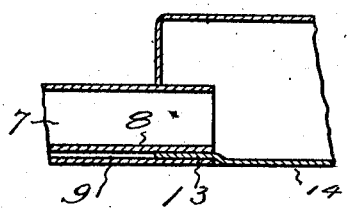
INVENTOR
Otto A. Frederickson
Harry P. Williams
Atty.

Patented Mar. 22, 1927.

1,622,032

UNITED STATES PATENT OFFICE.

OTTO A. FREDERICKSON, OF HARTFORD, CONNECTICUT, ASSIGNOR TO THE AMERICAN WIREMOLD CO., OF HARTFORD, CONNECTICUT, A CORPORATION OF CONNECTICUT.

ELECTRICAL CONDUIT.

Application filed August 20, 1925. Serial No. 51,394.

Conduits for concealing and protecting electric circuit wires which are designed to be run on the surfaces of walls and ceilings have been made of sheet metal. Such conduits have commonly been built up of several strips of metal-base or attaching strips for fastening the conduits in place and caps or covers for enclosing the wires. In some cases the bases have been channel shaped in cross section and in others the caps have been shaped to form the channel, and these parts have been sprung together or held by clips to provide the enclosed conduit.

The object of the present invention is to provide a sheet metal conduit which is formed of a single strip of relatively thin metal so bent or folded that it will be rigid and not liable to become bent or damaged when handled and installed, will have no obstruction in the interior to prevent the free passing of the circuit wires therethrough, and will have means whereby it may be quickly and firmly connected with an elbow or outlet box, switch box, fixture box, canopy or the like fitting.

This object is attained by bending a single strip of sheet metal so as to produce a race-way of the required size to contain the wires, with a double bottom or back to give stiffness to the conduit and provide means for a slip connection with tongues on the connectors, elbows or boxes to which the conduit is to be attached, said double bottom being of such shape that when the parts are assembled and installed the race-way is free from any obstruction which would interfere with the easy passing of the wires through the conduit.

In the accompanying drawings Fig. 1 shows a view of one form of conduit which embodies this invention. Fig. 2 shows a view of a modified form. Fig. 3 shows a view of another form. Fig. 4 is a view of a part of an elbow with which this conduit may be connected. Fig. 5 is a view of a portion of the base of a box or receptacle to which the conduit may be connected. Fig. 6 is a section of the end of a piece of conduit which embodies this invention attached to a portion of a box.

In the embodiment first illustrated the conduit is formed by folding a single strip of metal, by suitable machinery, so as to produce a tube with an enclosed race-way 7, the top and sides of which are of a single thickness of metal while the bottom is of double thickness. In this form one edge 8 of the strip is folded over upon itself so as to leave a space 9 between the two plies, the folded section being of substantially the full width of the race-way inside of the conduit. It is preferred to have the lower corners of the side walls flare outward, as at 10, so they will envelope the edges of the double bottom wall and thus leave a smooth passage in the interior of the conduit. The space is left between the two plies of the bottom for the reception of the tongues 11 of the elbow 12 or tongues 13 of the box bottom 14, as illustrated in Fig. 6. With the edges of the bottom protected, as stated, there will be no crack into which the wires may slip and become caught when they are passed through the conduit, and with the tongues inserted between the two layers of the bottom, the conduit and receptacle or other fitting are firmly held together and there is no obstruction which will interfere with the free passage of the wires. Doubling the bottom in this manner not only ensures a smooth interior, and provides means for the connection with a fitting, but increases the rigidity of the structure and eliminates the danger of damage or bending when the conduit is being handled.

In the second embodiment illustrated both edges 15 and 16 of the single strip of metal are bent over inwardly upon themselves and brought together so as to form the race-way 17 with the single wall top and sides and double wall bottom. This ensures the desired rigidity with the smooth race-way and provides the means required for the reception of the tongues of the fitting to which the conduit is to be connected.

In the third embodiment illustrated both edges 18 and 19 of the strip are bent over outwardly upon themselves and brought together. This provides the required rigidity, ensures the unobstructed race-way and affords means for connection to a fitting.

The exact cross sectional contour illustrated in the views is not material to the invention, which broadly resides in the one piece conduit with the single top and side walls and double bottom that provides means for attachment to a fitting and ensures rigidity with a smooth race-way.

The invention claimed is:—

1. A conduit for electric wires formed of a single strip of metal with a race-way having a top wall of a single thickness of metal, side walls of a single thickness of metal and a bottom wall of two thicknesses of metal spaced from each other, all of said walls being integral and said double bottom wall stiffening the conduit and providing means for its connection to a fitting.

2. A conduit for electric wires formed of a single strip of metal folded to provide an enclosed raceway, with an edge of the strip folded upon itself to provide two spaced plies along one side which stiffen the conduit and permit its connection to the tongue of a fitting without obstructing the raceway.

OTTO A. FREDERICKSON.